April 21, 1970     G. M. PREDDY ET AL     3,507,653
STENCIL SCREEN AND METHOD

Filed Dec. 29, 1966     5 Sheets-Sheet 5

INVENTORS.
GENADIUS M. PREDDY
WILLIAM B. UPCHURCH
BY
*Walter S. Zebrowski*
ATTORNEY

United States Patent Office 3,507,653
Patented Apr. 21, 1970

3,507,653
STENCIL SCREEN AND METHOD
Genadius M. Preddy, Durham, and William B. Upchurch, Castalia, N.C., assignors to Corning Glass Works, Corning, N.Y., a corporation of New York
Filed Dec. 29, 1966, Ser. No. 605,844
Int. Cl. G03c 5/00
U.S. Cl. 96—36.4                                    41 Claims

ABSTRACT OF THE DISCLOSURE

Stencil screen used for printing and an indirect, double exposure method of producing precision stencil screens which permit high print definition are disclosed. The photosensitive emulsion which forms the stencil screen blockage is exposed and developed directly on a photographic positive, and thereafter is transferred and bonded to a prestretched screen by means of a film of such emulsion which is itself exposed and developed.

BACKGROUND OF THE INVENTION

Stencil screens, commonly referred to as silk screens, have heretofore been fabricated by a direct method. Such a method of forming a stencil screen requires the application of a coating of a photosensitive emulsion to a prestretched screen which coating is thereafter dried. A photographic positive is formed having an opaque area, corresponding to the information to be printed by the screen, surrounded by a transparent area. The positive is then placed against the back side of the screen and the assembly is subjected to a suitable light which passes through the transparent portion of the positive and exposes the photosensitive emulsion applied to the screen. The positive is thereafter removed and the emulsion on the screen is developed so that the unexposed portion of the emulsion, corresponding to the information to be printed, is washed out leaving an open area in the screen through which the printing medium can thereafter pass. Stencil screens formed by this method permit formation of line widths which are limited to about 5 mils, which lines can be fabricated to a tolerance of only about ±1.5 mils. In addition, such stencil screens often result in printed line edges having a sawtooth effect. Further, the emulsion contains craters and pits due to the slow drying of the photosensitive emulsion contributing to the relatively poor quality of the resulting printed matter. Lines having widths of 1 or 2 mils, such as are desired for microcircuit conductive path applications for example, cannot be printed by a screen formed by such a method.

SUMMARY OF THE INVENTION

The objects of the present invention are to provide an economic stencil screen having a creater and pit-free emulsion and a method of fabricating such a screen that overcomes the heretofore noted disadvantages whereby smooth edged lines can be printed having small widths and spacing therebetween as well as having a very close dimensional tolerance.

According to the present invention, a stencil screen may be formed by providing a member or article, having an opaque first area corresponding to that of the desired print surrounded by a light transmitting second area, applying a coating of a photosensitive emulsion over one surface of the member, illuminating said emulsion through the member with a suitable light thereby exposing an area of the emulsion corresponding to the transparent second area while leaving an area of the emulsion corresponding to the opaque first area substantially unexposed, removing the unexposed portion of the emulsion, applying a film of a photosensitive emulsion to one surface of a prestretched screen such that it permeates therethrough, disposing the member adjacent the other surface of said screen so that the exposed emulsion on said member is wetted by the emulsion permeating through said screen whereby the member is adhered to the screen, illuminating the assembly so formed through the member with a suitable light thereby exposing an area of the emulsion film corresponding to the transparent second area while leaving an area of the emulsion film corresponding to the opaque first area substantially unexposed, removing the member, and thereafter removing the unexposed portion of the emulsion film.

Additional objects, features, and advantages of the present invention will become apparent, to those skilled in the art, from the following detailed description and the attached drawing, on which, by way of example, only the preferred embodiments of this invention are illustrated.

DETAILED DESCRIPTION

By the term stencil screen as used herein is meant a stretched screen, having a substantially impermeable emulsion applied to a portion thereof while the balance is uncoated permitting a printing medium to pass through, at least a portion of which balance corresponds in shape and configuration to that which is desired to be printed.

By the term printing as used herein is meant to form an impression or print of letters, characters, patterns, designs, artwork, and the like of any desired shape and configuration on any substrate.

By the term screen as used herein is meant a mesh, fabric, or cloth formed of any weavable material such as silk, nylon, Dacron, and the like fibers as well as metal wires such as, for example, as stainless steel.

Figure 1:
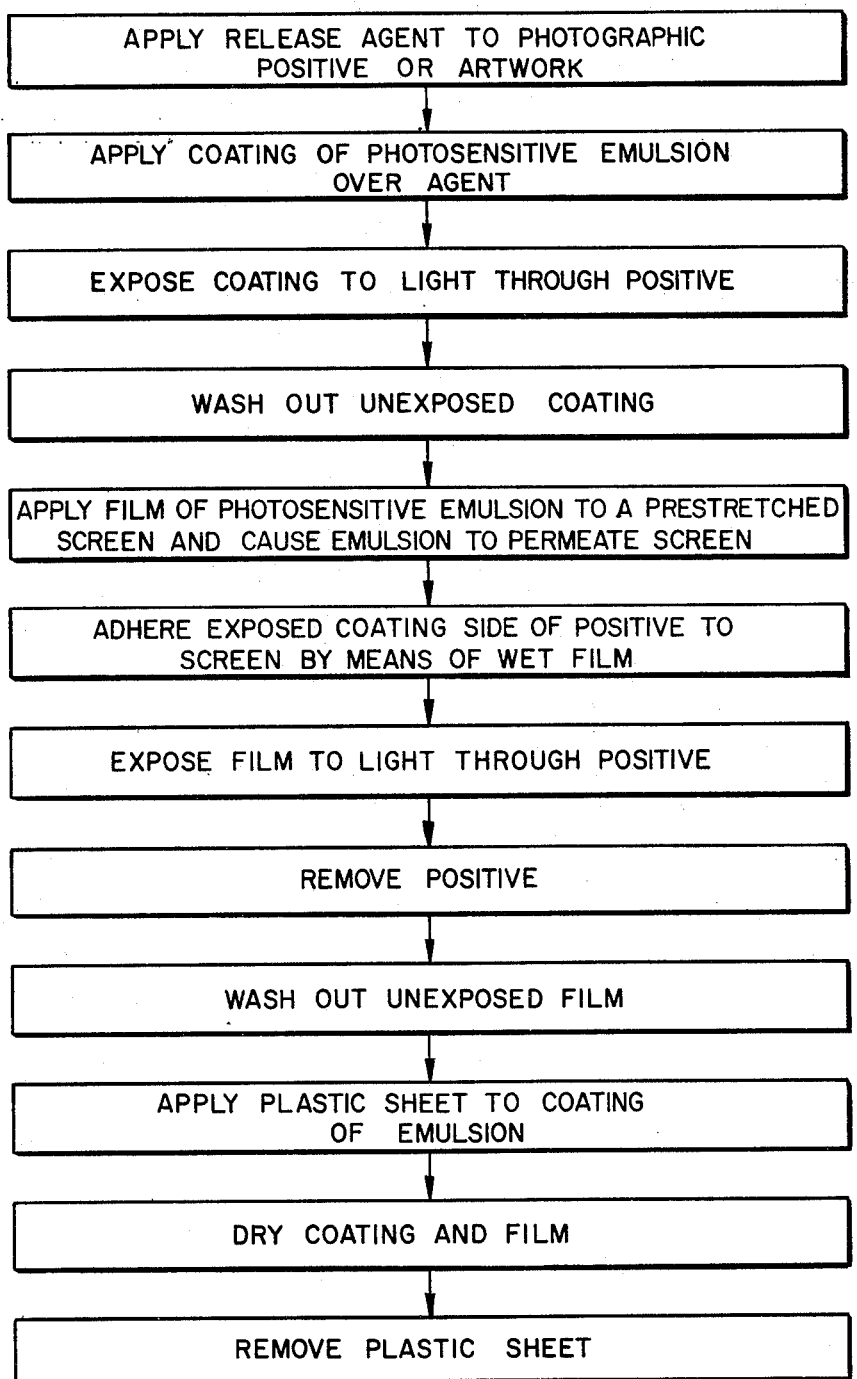
FIGURE 1 is a flow diagram illustrating the steps of the method of this invention.
Figure 2:
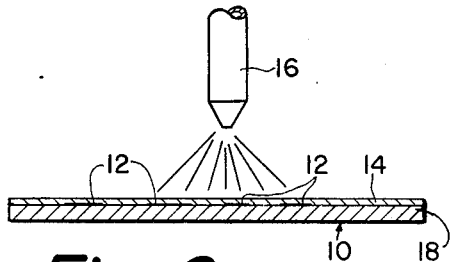
FIGURES 2–13 are diagrammatic views illustrating the various steps of one embodiment of this invention.
Figure 3:
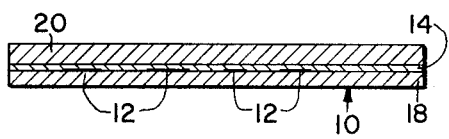

In accordance with this invention a photographic positive 10 or the like, having an opaque area 12 of substantially the same configuration as that which is desired to be printed, is coated with a thin film 14 of a release agent, such as for example, acrylic lacquer, resinous material, or the like. A suitable release agent must be clear, smooth, transparent or translucent, wettable by a photosensitive emulsion, and be capable of being applied in very thin films. Such a release agent may be applied by means of a spray nozzle 16 as illustrated in FIGURE 2. Opaque areas 12 of photographic positive 10 may be formed of a common photographic emulsion applied to an ordinary plastic backing 18. After the release agent is suitably dried, a coating 20 of a photosensitive emulsion is applied over film 14 as illustrated in FIGURE 3. Suitable examples of photosensitive emulsions are sensitized polyvinyl acetate, sensitized polyvinyl alcohol, sensitized gelatin, or the like, which hereinafter will be simply referred to as polyvinyl acetate, polyvinyl alcohol, gelatin and the like. Coating 20 may be applied by any suitable means known in the art, such as by placing the photographic positive on a rigid support and thereafter knife casting the emulsion over the surface.

Figure 4:
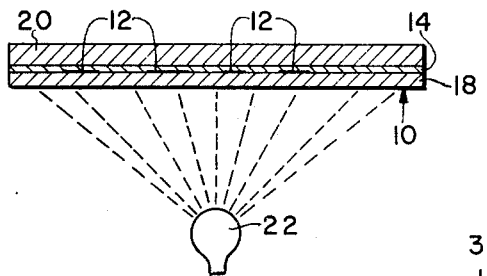

After coating 20 has been suitably dried, the assembly so formed is exposed to a suitable light 22 to expose that portion of coating 20 which surrounds opaque areas 12 as shown in FIGURE 4. Light 22 is schematically illustrated. While any carbon arc lamp or an ultraviolet light source may be used for this purpose, a collimated light is preferred. The length of time for the exposure of coating 20 will depend on the thickness of the coating as well as the composition thereof. It has also been found that the assembly may be placed within a vacuum chase and exposed to the light therein while the assembly is maintained under a vacuum. Employing a vacuum chase is desirable in order to maintain the positive perpendicular to the light source and at a preselected distance therefrom.

Figure 5:
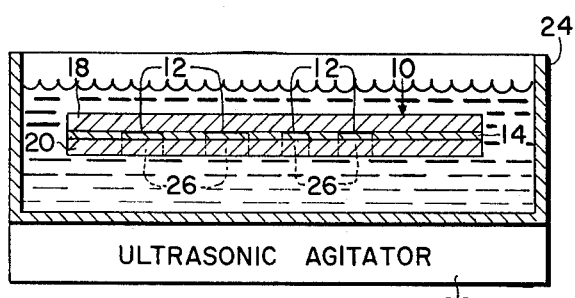
Figure 6:
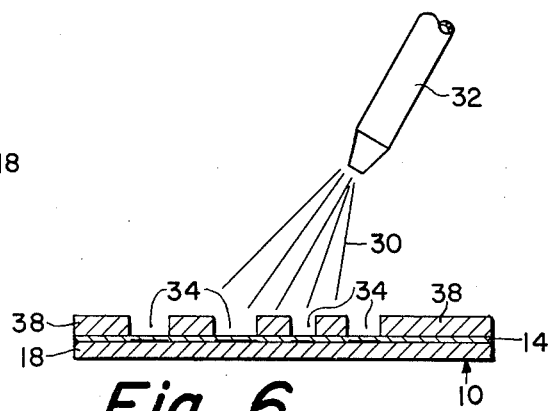

Referring now to FIGURE 5, the exposed emulsion coated assembly is then placed in a suitable water bath 24 as the first step in washing out the unexposed portion 26 of coating 20. To facilitate washing out unexposed portions 26, bath 24 may be subjected to the action of an ultrasonic agitator 28. Thereafter the assembly is subjected to a water spray 30, supplied by any suitable means such as nozzle 32 as a final step of washing out the unexposed portions of the coating. After the unexposed portions of the coating are washed out leaving channels 34 illustrated in FIGURE 6, the assembly is again dried.

Figure 7:
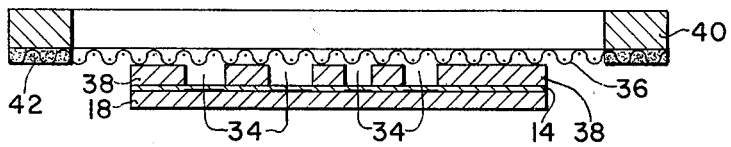
Figure 8:
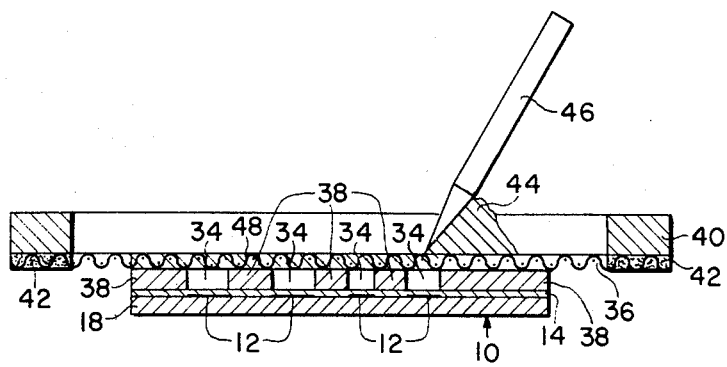

Referring now to FIGURE 7, after the assembly is dried, a prestretched screen 36 is disposed over exposed and remaining portions 38 of the photosensitive coating. Screen 36 is prestretched and maintained in place by bonding it to a suitable frame 40 by any suitable cement 42, such for example as epoxy cement, as is well known to one familiar with the art. Thereafter, a quantity of photosensitive emulsion 44 is placed on the back side of screen 36 and is spread out by means of a squeegee 46, or the like, to form film 48 of this emulsion. The emulsion permeates through screen 36 and wets portions 38 of the exposed emulsion which contact the other surface of screen 36 as illustrated in FIGURE 8. Photosensitive emulsion 44 may be of the same type as was used to form coating 20 or may be of any other suitable type as long as it forms a suitable bond between the exposed portion 38 and screen 36.

Figure 9:
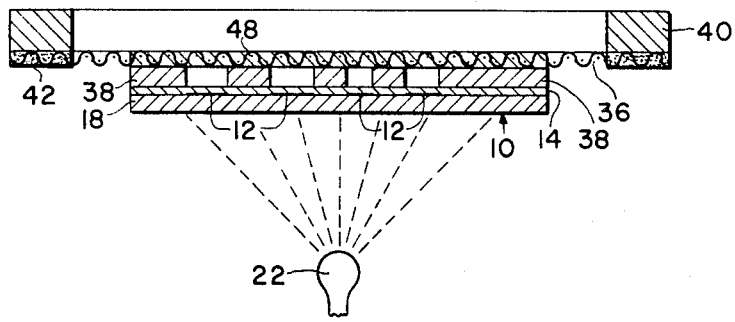
Figure 10:
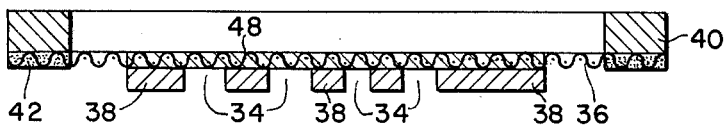
Figure 11:
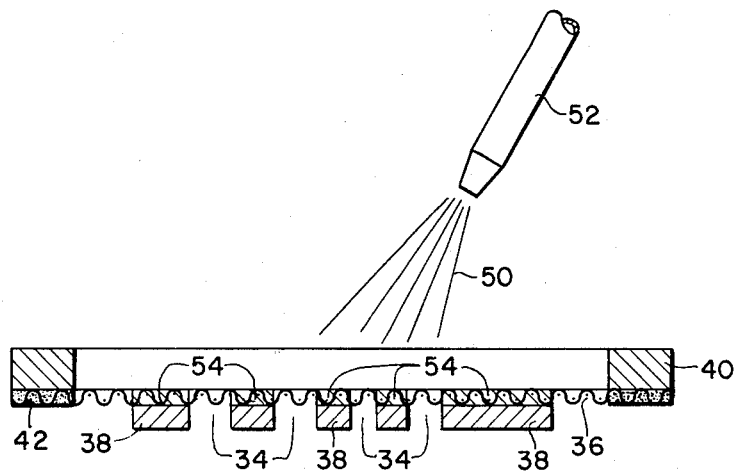

Referring now to FIGURE 9, after film 48 is dried, the assembly is again illuminated through positive 10 with a suitable light 22 to expose an area of film 48 corresponding to the transparent area of positive 10 and exposed portions 38 of coating 20. The unexposed portions of film 48 will correspond to opaque area 12 of positive 10. Thereafter, positive 10 together with release agent film 14 are stripped from the assembly leaving behind exposed portions 38 bonded to screen 36 by means of film 48 as illustrated in FIGURE 10. Portions 38 are separated by channels 34 which were formed by washing away the unexposed portion of coating 20. The assembly is then sprayed with a jet of water 50 from a suitable source such as nozzle 52 so as to wash out the unexposed portions of film 48 leaving behind exposed portions 54 of film 48 which correspond to exposed portions 38 of coating 20 as illustrated in FIGURE 11. If desired, an ultrasonic agitator may be used to aid in washing out the unexposed portions of film 48 in the same manner as described hereinabove in connection with the washing out of the unexposed portions 26. After the unexposed portions of film 48 are thoroughly washed out, channels 34 separating exposed portions 38 of coating 20, extend through film 48 and also separate exposed portions 54 thereof.

Figure 12:
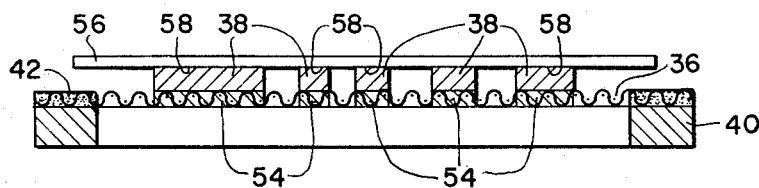
Figure 13:
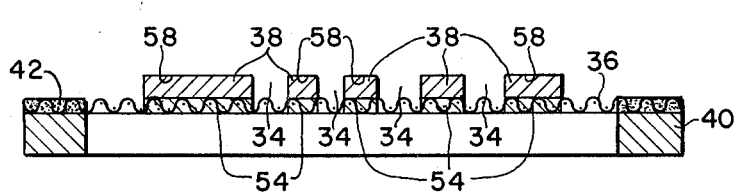

While exposed portions 54 and 38 are still moist and wet from the step of washing out of the unexposed portions of film 48, sheet 56 of synthetic resinous material, such as for example, Mylar, polyester, or the like is disposed adjacent the exterior surfaces of portions 38 and mechanically adhered thereto as illustrated in FIGURE 12. Exposed portions 38 and 54 are then suitably dried with sheet 56 in place, whereupon sheet 56 is removed leaving a finished stencil screen suitable for printing as illustrated in FIGURE 13. Sheet 56 is adhered to the outer surfaces 58 of portions 38 while they are drying so that these surfaces dry flat and smooth to prevent craters and pits from forming therein and so that they form sharp corners with the sidewalls of channels 34. Such flat surfaces and sharp corners permit the subsequent printed matter to have sharp edges and high definition by keeping the printing medium from flowing between these surfaces and the substrate being printed.

Figure 14:
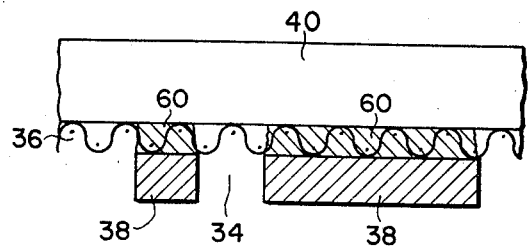
FIGURES 14 and 15 are fragmentary cross sectional views of completed screens.
Figure 15:
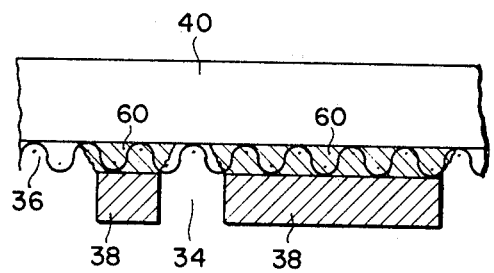
Figure 16:
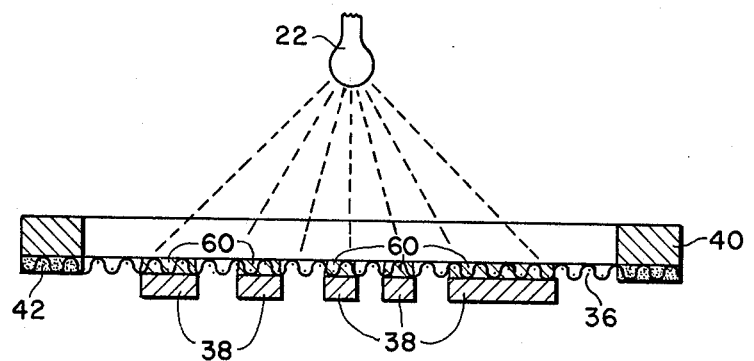
FIGURE 16 is a diagrammatic view illustrating a step of another embodiment of this invention.

Another embodiment of this invention is illustrated by the following. After photosensitive emulsion 44 is spread out over screen 36 to form film 48 which wets portions 38 of the exposed emulsion as illustrated in FIGURE 8, film 48 is dried and the assembly is exposed to a suitable light 22 for a period of time sufficient to partially expose film 48. Positive 10 together with release agent film 14 are stripped from the assembly leaving behind exposed portions 38 bonded to screen 36 by means of partially exposed film 48. The unexposed portions of film 48 are then washed out in the manner heretofore described. The remaining portions 60 may have uneven sidewalls as illustrated in FIGURE 14, however, such washing out of the partially exposed film prevents scattered, reflected, or refracted light during the second exposure to expose the upper portions of film 48 closing off channels 34 which separate portions 60 as illustrated in FIGURE 15. The partially exposed portions 60 are then further exposed to a suitable light after the washing out process, as illustrated in FIGURE 16, to complete the exposure of these remaining portions. The screen is then completed as hereinabove described in connection with FIGURES 12 and 13.

As is seen, in this embodiment film 48 is initially exposed for a period of time sufficient to permit adhesion of exposed portions 38 to screen 36 and to permit the washing out of the unexposed or substantially unexposed portions of film 48. The second exposure of remaining portions 60 merely completes the exposure process. The disadvantage of having the portions of channels 34, which separate portions 60, to be closed off partially is that it becomes difficult to pass the printing medium through such closed off channels 34 thereby increasing the possibility of the resulting print having ragged or uneven edges. This embodiment is particularly useful when exposed portions 38 are thick, necessitating the passage of light through a greater distance whereupon it may become scattered as heretofore described. The uneven sidewalls of those ends of channels 34 which separate portions 60 are not important since this is the side from which the printing medium is supplied. It is only important to have smooth, sharp sidewalls at the outer or printing end of channels 34, that is at the ends separating portions 38.

Still another embodiment of this invention involves applying a quantity of photosensitive emulsion on one surface of screen 36, spreading it out by means of a squeegee 46, or the like, to permeate the screen and to form film 48 before the prestretched screen is disposed on the positive. Therefore, referring to FIGURE 8, the film is formed on screen 38 without the positive beneath it, and thereafter such a coated screen is disposed on the positive so that the wet emulsion wets and adheres to portions 38. The assembly is thereafter treated, processed, and handled as heretofore described.

A typical example of one method of carrying out the present invention is illustrated by the following description. A photographic positive having an opaque first area corresponding to that of the desired print or impression surrounded by a light transmitting second area was provided. A coating of an acrylic lacquer was sprayed over the emulsion side of the photographic positive to form a transparent release film of approximately 0.2 mil in thickness. The coated positive was then dried at a temperature of about 72° F. for about 30 minutes. The photographic positive was then placed upon a smooth, flat, rigid surface with the lacquered surface exposed. Then a coating of polyvinyl acetate, a photosensitive emulsion, having a wet thickness of about 3 mils was cast over the film of acrylic lacquer by means of a precision knife casting machine. The assembly so formed was allowed to remain at room temperature for about 4 hours to permit the coating of polyvinyl acetate to dry.

The thus coated photographic positive was placed within a vacuum chase and a vacuum of about 15 inches of mercury was drawn. The positive was then exposed to a carbon arc lamp for about 40 seconds from the uncoated side of the positive. In this manner the light passed through the positive and exposed only that portion of the polyvinyl acetate which surrounded the opaque areas of the positive. This assembly was then placed in a water bath at 110° F. for about 15 to 30 seconds whereupon ultrasonic agitation was provided so that the unexposed portion of the polyvinyl acetate could be washed out. The washing out process was concluded by removing the coated positive from the ultrasonic bath and spraying it with a fine mist of water for several minutes. The excess water was then removed by a gentle stream of air and the assembly was permitted to dry at room temperature for about 3 hours.

A prestretched screen was formed by providing a metallic frame having at least one flat surface, adjacent to which a nylon screen was disposed. The screen was stretched in all directions and bonded to the frame by means of an epoxy cement, which cement was thereafter permitted to dry while tension was maintained on the screen.

The coated positive was again placed on the smooth, flat, rigid surface with the exposed emulsion side up and the prestretched screen was disposed adjacent to the emulsion. A quantity of wet emulsion was then placed on the other surface of the screen and was spread out over the screen with a squeegee so that the wet emulsion would permeate the screen and wet the surfaces of the exposed and developed emulsion on the photographic positive. The assembly was then permitted to dry at room temperature for about 4 hours. In this manner the exposed and developed emulsion on the photographic positive was caused to bond to the prestretched screen.

This assembly was then placed in a vacuum chase and a vacuum of 15 inches of mercury was drawn. The assembly was again exposed to a carbon arc light through the positive for approximately 30 seconds. In this manner an area of the film of emulsion corresponding to the transparent area on the photographic positive, that is the area surrounding the opaque area of the positive, was exposed to the light.

After the assembly was removed from the vacuum chase, the photographic positive and the film of acrylic lacquer release agent was removed from the assembly by stripping and the exposed and developed emulsion, which was bonded to the screen, was uncovered. The screen assembly was then soaked in water having a temperature of about 110° F. for approximately 15 to 30 seconds and the unexposed portion of the emulsion film was washed out by means of an ultrasonic bath and a water spray as heretofore described. After all of the unexposed emulsion was removed the surface water was blown off by an air stream. While the emulsion on the stencil screen was still wet, a transparent Mylar plastic film was placed adjacent the exterior surface of the exposed and developed emulsion and the film was adhered to the emulsion by means of pressure from a roller. This assembly was then permitted to dry for about sixteen hours at room temperature. After the assembly was thoroughly dried, the plastic film was removed by stripping it off producing a completed stencil screen.

A screen produced as described in the typical example is capable of printing lines of a slurry of electrically conductive material having a width of about 1 mil and a tolerance of between ±0.00 to −0.03 mil and very smooth edges. The exposed and developed emulsion on the screen is free of craters and pits.

It is obvious that a stencil screen formed by the method of this invention is suitable for printing microcircuit paths, decorative art work, ordinary printing matter, or the like.

Although the present invention has been described with respect to the specific details of certain embodiments thereof, it is not intended that such details be limitations upon the scope of the invention except insofar as set forth in the following claims.

What is claimed is:

1. A method of forming a stencil screen comprising the steps of:
    forming an article having an opaque first area corresponding to that of the print desired surrounded by a transparent second area,
    applying a film of a release agent to one surface of said article,
    applying a coating of photosensitive emulsion over said film of release agent,
    illuminating said emulsion through said article with a suitable light thereby exposing an area of said emulsion corresponding to said transparent area while leaving the area thereof corresponding to said opaque area substantially unexposed,
    removing the unexposed portion of said emulsion,
    providing a prestretched screen,
    bonding the exposed emulsion to said screen, and thereafter
    removing said article.

2. The method of claim 1 wherein said article is a photographic positive.

3. The method of claim 1 wherein said photosensitive emulsion is polyvinyl acetate.

4. The method of claim 3 wherein said light is ultraviolet light.

5. The method of claim 1 wherein said exposed emulsion is bonded to said screen by:
    disposing said article adjacent one surface of said screen with said exposed emulsion in contact therewith,
    applying a film of a photosensitive emulsion to the other surface of said screen such that it permeates therethrough and wets the surface of said exposed emulsion,
    illuminating the assembly so formed through said article with a suitable light thereby exposing an area of said film of emulsion corresponding to said transparent area while leaving the area thereof corresponding to said opaque area substantially unexposed,
    removing said article, and thereafter
    removing the unexposed portion of said film of emulsion.

6. The method of claim 5 wherein said article is a photographic positive.

7. The method of claim 6 wherein said release agent is acrylic lacquer.

8. The method of claim 7 wherein said coating of photosensitive emulsion is polyvinyl acetate.

9. The method of claim 8 wherein said film of photosensitive emulsion is polyvinyl acetate.

10. The method of claim 9 wherein said coating and film of photosensitive emulsion is illuminated by ultraviolet light.

11. The method of claim 10 wherein said unexposed portion of the coating and film of emulsion is removed by washing with water.

12. The method of claim 5 further comprising the steps of:
applying a thin plastic film over the surface of the exposed portion of said coating of photosensitive emulsion after said article and the unexposed portion of said film of emulsion are removed,
drying the remaining emulsions, and therafter removing said plastic film.

13. The method of claim 12 wherein said plastic film is rolled onto said surface of said exposed emulsion to adhere it thereto and to squeeze out any air between said plastic film and said surface of said emulsion.

14. The method of claim 12 wherein said release agent is acrylic lacquer.

15. The method of claim 14 wherein said coating and film of photosensitive emulsion is polyvinyl acetate.

16. The method of claim 15 wherein said coating and film of photosensitive emulsion is illuminated by ultraviolet light.

17. The method of claim 16 wherein said unexposed portion of the coating and film of emulsion is removed by washing with water.

18. The method of claim 17 wherein said plastic film is rolled onto said surface of said exposed emulsion to adhere it thereto and to squeeze out any air between said plastic film and said surface of said emulsion.

19. The method of claim 1 wherein said exposed emulsion is bonded to said screen by:
disposing said article adjacent one surface of said screen with said exposed emulsion in contact therewith,
applying a film of a photosensitive emulsion to the other surface of said screen such that it permeates therethrough and wets the surface of said exposed emulsion,
illuminating the assembly so formed through said article with a suitable light so as to partially expose an area of said film of emulsion corresponding to said transparent area while leaving the area thereof corresponding to said opaque area substantially unexposed,
removing said article,
removing the unexposed portion of said film of emulsion, and thereafter
illuminating the assembly so formed with a suitable light to complete exposure of the remaining portions of said film of emulsion.

20. The method of claim 19 wherein said article is a photographic positive.

21. The method of claim 20 wherein said release agent is acrylic lacquer.

22. The method of claim 20 further comprising the steps of:
applying a thin plastic film over the surface of the exposed portion of said coating of photosensitive emulsion after the exposure of the remaining portions of said film of emulsion is completed,
drying the remaining emulsions, and therafter removing said plastic film.

23. The method of claim 22 wherein said plastic film is rolled onto said surface of said exposed emulsion to adhere it thereto and to squeeze out any air between said plastic film and said surface of said emulsion.

24. The method of claim 23 wherein said coating and film of photosensitive emulsion is polyvinyl acetate.

25. The method of claim 24 wherein said coating and film of photosensitive emulsion is illuminated with ultraviolet light.

26. The method of claim 25 wherein said unexposed portion of the coating and film of emulsion is removed by washing with water.

27. The method of claim 23 wherein said release agent is acrylic lacquer.

28. The method of claim 1 wherein said exposed emulsion is bonded to said screen by:
applying a film of a photosensitive emulsion to one surface of said screen such that it permeates therethrough,
disposing said article adjacent the other surface of said screen such that said exposed emulsion is wetted by the emulsion permeating through said screen whereby said article is adhered to said screen,
illuminating the assembly so formed through said article with a suitable light thereby exposing an area of said film of emulsion corresponding to said transparent area while leaving the area thereof corresponding to said opaque area substantially unexposed,
removing said article, and thereafter
removing the unexposed portion of said film of emulsion.

29. The method of claim 28 wherein said article is a photographic positive.

30. The method of claim 29 wherein said release agent is acrylic lacquer.

31. The method of claim 28 further comprising the steps of:
applying a thin plastic film over the surface of the exposed portion of said coating of photosensitive emulsion after said article and the unexposed portion of said film of emulsion are removed,
drying the remaining emulsions, and thereafter removing said plastic film.

32. The method of claim 31 wherein said plastic film is rolled onto said surface of said exposed emulsion to adhere it thereto and to squeeze out any air between said plastic film and said surface of said emulsion.

33. The method of claim 1 wherein said exposed emulsion is bonded to said screen by:
applying a film of a photosensitive emulsion to one surface of said screen such that it permeates therethrough,
disposing said article adjacent the other surface of said screen such that said exposed emulsion is wetted by the emulion permeating through said screen whereby said article is adhered to said screen,
illuminating the assembly so formed through said article with a suitable light so as to partially expose an area of said film of emulsion corresponding to said transparent area while leaving the area thereof corresponding to said opaque area substantially unexposed,
removing said article,
removing the unexposed portion of said film of emulsion, and thereafter
illuminating the assembly so formed with a suitable light to complete exposure of the remaining portions of said film of emulsion.

34. The method of claim 33 wherein said article is a photographic positive.

35. The method of claim 33 further comprising the steps of:
applying a thin plastic film over the surface of the exposed portion of said coating of photosensitive emulsion after the exposure of the remaining portions of said film of emulsion is completed,
drying the remaining emulsions, and thereafter removing said plastic film.

36. The method of claim 35 wherein said plastic film is rolled onto said surface of said exposed emulsion to adhere it thereto and to squeeze out any air between said plastic film and said surface of said emulsion.

37. The method of claim 36 wherein said article is a photographic positive.

38. The method of claim 37 further comprising the step of applying a film of a release agent to said positive before applying said coating of photosensitive emulsion.

39. The method of claim 37 wherein said coating and film of photosensitive emulsion is polyvinyl acetate.

40. The method of claim 39 wherein said release agent is acrylic lacquer.

41. The screen formed by the method of claim 1.

References Cited
UNITED STATES PATENTS

| | | | |
|---|---|---|---|
| 2,267,788 | 12/1941 | Marco | 101—128.3 |
| 2,366,083 | 12/1944 | Box et al. | 101—128.3 |
| 3,390,993 | 7/1968 | Borchers | 96—36.4 |

DONALD LEVY, Primary Examiner

J. P. BRAMMER, Assistant Examiner

U.S. Cl. X.R.

101—128.3

PO-1050
(5/69)

UNITED STATES PATENT OFFICE
CERTIFICATE OF CORRECTION

Patent No. 3,507,653        Dated April 21, 1970

Inventor(s) Genadius M. Preddy and William B. Upchurch

It is certified that error appears in the above-identified patent and that said Letters Patent are hereby corrected as shown below:

Column 1, line 56, "creater" should read --crater--

Column 9, claim 38 should be deleted

In the heading to the printed specification, line 8, "41 Claims" should read - 40 Claims --.

SIGNED AND
SEALED
AUG 25 1970

AUG. 25.1970

(SEAL)
Attest:

Edward M. Fletcher, Jr.
Attesting Officer

WILLIAM E. SCHUYLER, JR.
Commissioner of Patents